(12) United States Patent
Vijendra et al.

(10) Patent No.: US 11,232,009 B2
(45) Date of Patent: Jan. 25, 2022

(54) MODEL-BASED KEY PERFORMANCE INDICATOR SERVICE FOR DATA ANALYTICS PROCESSING PLATFORMS

(71) Applicant: EMC IP Holding Company LLC, Hopkinton, MA (US)

(72) Inventors: Sudhir Vijendra, Westborough, MA (US); Shashidhar Krishnaswamy, White Plains, NY (US)

(73) Assignee: EMC IP Holding Company LLC, Hopkinton, MA (US)

(*) Notice: Subject to any disclaimer, the term of this patent is extended or adjusted under 35 U.S.C. 154(b) by 288 days.

(21) Appl. No.: 16/112,379

(22) Filed: Aug. 24, 2018

(65) Prior Publication Data
US 2020/0065208 A1 Feb. 27, 2020

(51) Int. Cl.
*G06F 11/34* (2006.01)
*G06F 11/30* (2006.01)

(52) U.S. Cl.
CPC ...... *G06F 11/3409* (2013.01); *G06F 11/3024* (2013.01)

(58) Field of Classification Search
CPC ............. G06F 11/3409; G06F 11/3024; G06F 11/3447; G06F 11/3034; G06F 11/302; G06N 20/00; H04L 41/5009
See application file for complete search history.

(56) References Cited

U.S. PATENT DOCUMENTS

| 2008/0174426 A1 | 7/2008 | Hackworth et al. |
| 2017/0078442 A1 | 3/2017 | Pacella et al. |
| 2017/0199770 A1 | 7/2017 | Peteva et al. |

OTHER PUBLICATIONS

Handurukande et al., IPTV Service Modeling in Magneto Networks, 2010 IEEE/IFIP Network Operations and Management Symposium Workshops, pp. 51-54 (Year: 2010).*
Ragunathan et al., Statistical KPIs in HMI Panels, 2015 IEEE, pp. 838-843 (Year: 2015).*

(Continued)

*Primary Examiner* — Toan M Le
(74) *Attorney, Agent, or Firm* — Ryan, Mason & Lewis, LLP

(57) ABSTRACT

A processing platform includes a plurality of processing devices each including a processor coupled to a memory, and is configured to communicate over at least one network with one or more data sources. The processing platform is further configured to receive input data from the one or more data sources, to identify an instance of a key performance indicator (KPI) management data model associated with the received input data, and to perform a particular KPI service on the received input data in accordance with the identified instance of the KPI management data model. Performing the particular KPI service illustratively includes: utilizing the identified instance of the KPI management data model to extract one or more metrics from the received input data and to compute one or more KPIs based at least in part on the one or more extracted metrics; and generating analytics output including the one or more computed KPIs for the received input data.

20 Claims, 12 Drawing Sheets

(56) References Cited

OTHER PUBLICATIONS

Tanaka et al., Common Sensing and Analyses to Visualize a Production Process with Parallelly Utilized Resource, Published on Jul. 8-13, 2018, 2018 7th International Congress on Advanced Applied Informatics (IIAI-AAI), Yonago, Japan, pp. 639-644 (Year: 2018).*
Abstract_Tanaka et al., Jul. 8-13, 2018, 1 pp. (Year: 2018).*
Google Search Results, Jun. 17, 2021, 1 pp. (Year: 2021).*
C. Yan et al., "High-Performance Elastic Management for Cloud Containers Based on Predictive Message Scheduling," Future Internet, Dec. 2017, 13 pages, vol. 9, No. 4.
prometheuis.io, "Prometheus—Introduction," https://prometheus.io/docs/introduction/overview/, 2018, 4 pages.
Wikipedia, "Nagios," https://en.wikipedia.org/wiki/Nagios, Aug. 23, 2018, 4 pages.
opentsdb.net, "How Does OpenTSDB Work?" https://opentsdb.net/overview.html, 2017, 2 pages.
influxdata.com, "InfluxDB: InfluxDB is the Time Series Database in the TICK Stack," https://www.influxdata.com/time-series-platform/influxdb/, 2018, 4 pages.
flink.apache.org, "What is Apache Flink?" https://flink.apache.org/flink-architecture.html, retrieved Aug. 24, 2018, 3 pages.
Wikipedia, "Apache Spark," https://en.wikipedia.org/wiki/Apache_Spark, Aug. 20, 2018, 6 pages.
U.S. Appl. No. 16/016,103, filed in the name of Sudhir Vijendra et al. on Jun. 22, 2018 and entitled "Adaptive Thresholds for Containers."

* cited by examiner

| Attribute | Description |
|---|---|
| name | Name of the KPI |
| kpiType | Real-Time or Batch |
| calculation | Math/ML Expression for KPI calculation OR Algorithms |
| metrics | Select metrics for KPI calculation |
| window | Sliding Window or Tumbling window |
| filters | Filters for the input data |
| input | Input Source for KPI calculation (Kafka, File, Database etc.) |
| output | Output Destination for KPI calculation (Kafka, File, Database etc.) |

FIG. 5

| Attribute | Description |
|---|---|
| name | scaleIOStorageIoPS |
| kpiType | realTime |
| metrics | {"totalreadBwc.numOccurred", "totalreadBwc.numSeconds", "totalwriteBwc.numSeconds} |
| calculation | "sum(totalReadBwc.numOccurred)/sum(totalReadBwc.totalSeconds)+ sum(totalWriteBwc.numOccurred)/sum(totalWriteBwc.numSeconds)" |
| window | sliding |
| filters | {group != "ITgrp1" && group != "ITgrp2"} |
| input | {"source" : "kafka", "attributes" : {"group.id" : "ngx", "bootstrap.servers" :"10.240.16.165:29092, "topic": "performance"} |
| output | {"destination" : "HDFS", "attributes" : {"bootstrap.servers" :"10.240.16.165:29092, "topic": "performance"} |

FIG. 6

| Attribute | Description |
|---|---|
| name | StorageUtilization |
| kpiType | realTime |
| metrics | {"capacityInUseInKb", "unusedCapacityInKb"} |
| calculation | "100*(avg(capacityInUseInKb)/average(capacityInUseInKb))" |
| window | sliding |
| filters | {group != "ITgrp1" && group != "ITgrp2"} |
| input | { "source" : "kafka", "attributes" : { "group.id" : "ngx", "bootstrap.servers"" 10.240.16.165:29092, "topic": "perfomance"} |
| output | {"destination" : "HDFS", "attributes" : {"bootstrap.servers"" 10.240.16.165:29092, "topic": "performance"} |

FIG. 7

| Attribute | Description |
|---|---|
| name | DataCenter HealthScore |
| kpiType | realTime |
| metrics | {" scaleIOStorageIOPS", " storageUtilization", "networkUtilization"} |
| calculation | "range(scaleIOStorageIOS, iops_scores, iops_values) + range(storageUtilization, util_score,util_values) + range(networkUtilization, network_scores, network_values) |
| ranges | { "iops_scores" :"1,2,3,4,5", iops_values" :"0,150,200,250,300", "util_scores", "5,4,3,2,1", "util_values" : "0,60,70,80,90", "network_scores", "5,4,3,2,1", "network_values" : "0,60,70,80,90", } |
| window | sliding |
| filters | (group != "ITgrp1" && group != "ITgrp2") |
| input | {"source" : "kafka", "attributes" : {"group.id" : "ngx", "bootstrap.servers"" "10.240.16.165:29092, "topic" : "performance"} |
| output | {{"destination" : "HDFS", "attributes" : { "bootstrap.servers"" "10.240.16.165:29092, "topic" : "performance"} |

FIG. 8

| Attribute | Description |
|---|---|
| name | NetworkUtilization_EucliedeanDistance |
| kpiType | historical |
| metrics | {"networkUtilization"} |
| calculation | $D(q,p) = \sqrt{\sum(qi-pi)^2}$ |
| window | sliding |
| filters | {group != "ITgrp1" && group != "ITgrp2"} |
| input | {"source" : "kafka", "attributes" : {"group.id" : "ngx", "bootstrap.servers" : "10.240.16.165:29092", "topic" : "performance"}} |
| output | {"destination" : "HDFS", "attributes" : {"bootstrap.servers" : "10.240.16.165:29092", "topic" : "performance"}} |

FIG. 9

| URI | Operation |
|---|---|
| /KPI/create | POST |
| /KPI/{kpiName}/update | PUT |
| /KPI/{kpiName}/delete | POST |
| /KPI/{kpiName}/submit | POST |
| /KPI/{kpiName}/enable | PUT |
| /KPI/{kpiName}/disable | PUT |

FIG. 10

MODEL-BASED KEY PERFORMANCE INDICATOR SERVICE FOR DATA ANALYTICS PROCESSING PLATFORMS

FIELD

The field relates generally to information processing systems, and more particularly to data analytics in such systems.

BACKGROUND

In many information processing systems, there is a need to perform data analytics on data obtained from various data sources. For example, it is often desirable to determine if real-time streaming data from deployed Internet of Things (IoT) sensors meets certain predetermined conditions. In these and other contexts, conventional analytics approaches can be problematic in that configuring a given system to perform particular types of data analytics on particular types of data is unduly complex and time-consuming for system users. For example, different types of streaming analytics systems, time-series databases and monitoring systems utilized in performing data analytics typically utilize distinct application programming interfaces (APIs) and present other distinct analytics features that must be separately mastered by system users in order to obtain the desired analytics output.

SUMMARY

Illustrative embodiments provide techniques for implementation of model-based key performance indicator (KPI) services in analytics platforms and other types of processing platforms. Such arrangements in some embodiments advantageously facilitate the uniform specification and computation of KPI services for performing analytics using a variety of different types of data. These embodiments avoid the need for user mastery of potentially large numbers of distinct APIs that may be associated with various types of streaming analytics systems, time-series databases and monitoring systems utilized in performing data analytics. As a result, the cost and complexity of performing data analytics is considerably reduced. Moreover, automated decision making and other automated processing performed in an information processing system utilizing analytics output is considerably enhanced through the use of model-based KPI services, leading to improved system performance.

In one embodiment, an apparatus comprises a processing platform, with the processing platform including a plurality of processing devices each comprising a processor coupled to a memory. The processing platform is configured to communicate over a network with one or more data sources, such as, for example, one or more real-time streaming data sources, databases and/or data lakes. The processing platform is further configured to receive input data from the one or more data sources, to identify an instance of a KPI management data model associated with the received input data, and to perform a particular KPI service on the received input data in accordance with the identified instance of the KPI management data model.

The received input data illustratively comprises at least one of real-time streaming data received from one or more real-time data sources and batch data retrieved from one or more databases or data lakes.

Performing the particular KPI service illustratively comprises: utilizing the identified instance of the KPI management data model to extract one or more metrics from the received input data and to compute one or more KPIs based at least in part on the one or more extracted metrics; and generating analytics output comprising the one or more computed KPIs for the received input data.

The processing platform in some embodiments is configured to perform different KPI services in accordance with respective different instances of the KPI management data model with each such instance having a plurality of fields arranged in a predefined format common to the different instances. The processing platform is illustratively configured to permit at least one instance of the KPI management data model to be shared by multiple distinct cloud infrastructure tenants.

The identified instance of the KPI management data model illustratively comprises a plurality of fields including at least a metrics field specifying the one or more metrics to be extracted in performing the particular KPI service and a calculation field specifying the manner in which the one or more KPIs are to be computed based at least in part on the one or more extracted metrics.

Additional or alternative fields in some embodiments include a type field specifying whether the received input data comprises real-time data or batch data, a window field specifying a particular type of computational window, such as a sliding window or a tumbling window, for computation of the one or more KPIs, a filters field specifying one or more filters to be applied to the received input data, an input field identifying the one or more sources of the received input data, and an output field identifying at least one destination for the analytics output comprising the one or more computed KPIs.

In some embodiments, the processing platform comprises an analytics engine configured to perform the particular KPI service on the received input data in accordance with the identified instance of the KPI management data model.

In other embodiments, the processing platform comprises a time-series database configured to perform the particular KPI service on the received input data in accordance with the identified instance of the KPI management data model.

The processing platform is illustratively configured to generate the analytics output at least in part by delivering the one or more computed KPIs to a message broker.

Additionally or alternatively, the processing platform is configured to provide an application programming interface through which at least portions of at least one instance of the KPI management data model are configurable by a system user.

These and other illustrative embodiments include, without limitation, methods, apparatus, information processing systems, and computer program products comprising processor-readable storage media.

BRIEF DESCRIPTION OF THE DRAWINGS

FIG. 5 shows an example of a KPI management data model in an illustrative embodiment.

FIGS. 6 through 9 show examples of particular instances of the example KPI management data model of FIG. 5 as configured to control performance of respective different model-based KPI services in illustrative embodiments.

FIG. 10 shows an example of an application programming interface utilized to specify parameters of a KPI service in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
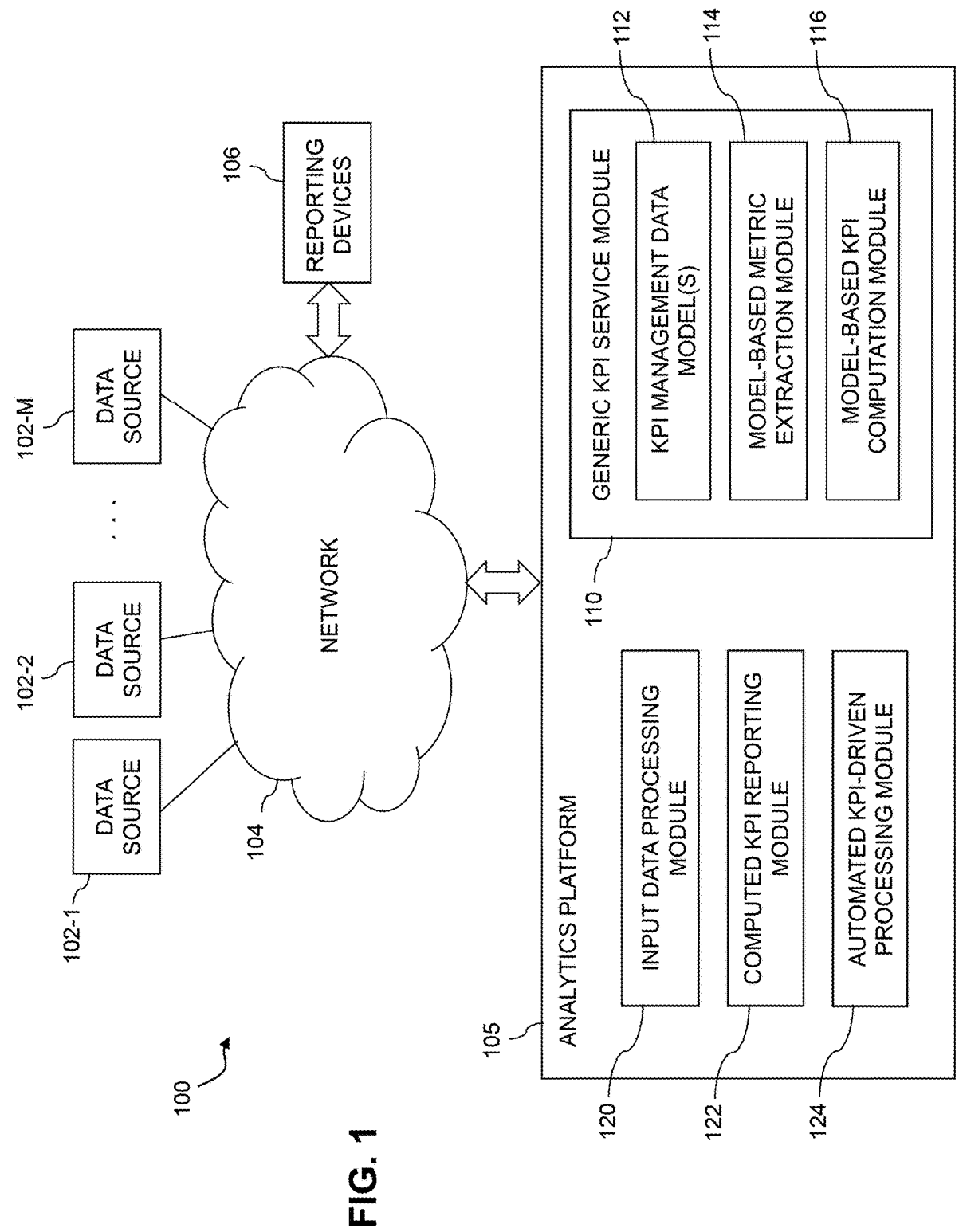
FIG. 1 is a block diagram of an information processing system including an analytics platform implementing model-based KPI services utilizing respective instances of a KPI management data model in an illustrative embodiment.

FIG. 1 shows an information processing system 100 configured in accordance with an illustrative embodiment. The information processing system 100 comprises a plurality of data sources 102-1, 102-2, . . . 102-M configured to communicate over a network 104 with an analytics platform 105. The analytics platform 105 is an example of what is more generally referred to herein as a "processing platform," and it is to be appreciated that a wide variety of other types of processing platforms can be used in other embodiments.

Also coupled to the network 104 are reporting devices 106. The reporting devices 106 illustratively comprise computers, mobile telephones or other types of processing devices associated with respective KPI service architects, system administrators, information technology (IT) operations specialists or other system users.

The analytics platform 105 comprises a generic KPI service module 110 that includes one or more KPI management data models 112, a model-based metric extraction module 114 and a model-based KPI computation module 116.

Also included in the analytics platform 105 are additional components comprising an input data processing module 120, a computed KPI reporting module 122, and an automated KPI-driven processing module 124.

The analytics platform 105 is assumed to comprise a plurality of processing devices each having a processor coupled to a memory. One or more such processing devices may be implemented at least in part utilizing one or more virtual machines, containers or other types of virtualization infrastructure. Examples of processing platform implementations will be described below in conjunction with FIGS. 11 and 12.

The analytics platform 105 in some embodiments more particularly comprises at least a portion of a cloud-based data center or other cloud-based computer system, although other types of processing platforms may be used in other embodiments. For example, in some embodiments, the analytics platform 105 can part of an enterprise-based computer system rather than a cloud-based computer system.

A given cloud-based implementation of analytics platform 105 illustratively includes commercially-available cloud infrastructure, such as an allocated portion of an Amazon Web Services (AWS) system. Other examples of cloud-based systems that can be used to implement one or more processing platforms of system 100 include Google Cloud Platform (GCP) and Microsoft Azure.

A cloud-based system of this type illustratively comprises a Platform-as-a-Service (PaaS) layer overlying an Infrastructure-as-a-Service (IaaS) layer. The IaaS layer may comprise a plurality of virtual machines supporting application containers of the PaaS layer. For example, host devices in such an embodiment illustratively correspond to respective ones of the virtual machines of the IaaS layer.

The analytics platform 105 is assumed to be accessible to a plurality of system users. The term "user" in this context and elsewhere herein is intended to be broadly construed so as to encompass, for example, human, hardware, software or firmware entities, as well as various combinations of such entities. At least some of the system users can be associated with respective ones of the reporting devices 106 and/or other types of processing devices through which those users interface with the analytics platform 105 and possibly other system components. These processing devices associated with system users can include, for example, desktop, laptop or tablet computers, mobile telephones, or other types and arrangements of devices that support user interfaces to functionality of system 100.

The network 104 may comprise any of a variety of different types of networks, including by way of example a global computer network such as the Internet, a wide area network (WAN), a local area network (LAN), a satellite network, a telephone or cable network, a cellular network, a wireless network such as a WiFi or WiMAX network, or various portions or combinations of these and other types of networks.

The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniB and, Gigabit Ethernet or Fibre Channel. Numerous alternative networking arrangements are possible in a given embodiment, as will be appreciated by those skilled in the art. The term "network" as used herein is intended to be broadly construed, and may encompass, for example, an internal network of a given system over which analytics modules of that system access various data sources.

Although only a single analytics platform 105 is shown in this embodiment, the system 100 can comprise one or more additional analytics platforms, each possibly associated with a different set of data sources 102.

In some embodiments, the data sources 102 comprise IoT sensors. Such IoT sensors can include any of a wide variety of different IoT device types that can be incorporated into or otherwise associated with the system 100 for purposes of generating IoT data that is processed using analytics platform 105. At least a portion of the IoT sensors can be configured to send and receive machine-to-machine (M2M) communications in accordance with standardized M2M protocols.

Other examples of data sources 102 include network, storage and compute resources of IT infrastructure of the system 100.

In some embodiments, the data sources 102 provide real-time streaming and/or batch input data to the analytics platform 105. For example, input data provided to the analytics platform 105 by one or more of the data sources 102 illustratively comprises at least one of real-time streaming data received from one or more real-time data sources and batch data retrieved from one or more databases or data lakes.

At least a subset of the data sources 102 may therefore be associated with one or more storage systems from which data is provided to the analytics platform 105 over the network 104 for real-time or batch analysis.

A given such storage system illustratively comprises at least one VNX® or Symmetrix VMAX® storage array from Dell EMC of Hopkinton, Mass. Other types of storage arrays that may be used in illustrative embodiments include scale-out all-flash content addressable storage arrays such as XtremIO™ storage arrays, also from Dell EMC. The storage system is illustratively configured to implement at least portions of one or more databases or data lakes associated with analytics platform 105.

The term "storage system" as the term is broadly used herein is not limited to storage arrays, but can comprise other types of storage systems. For example, a storage system can comprise network-attached storage (NAS), storage area networks (SANs), direct-attached storage (DAS) and distributed DAS, as well as combinations of these and other storage types, including software-defined storage.

Other examples of particular types of storage products that can be used in implementing storage systems in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

Although shown as separate from the analytics platform 105, one or more of the data sources 102 may be part of the same processing platform that implements the functionality of the analytics platform 105. For example, in embodiments in which one or more of the data sources 102 comprise at least portions of a storage system, the storage system can be implemented using one or more storage arrays or other storage resources of a given processing platform that also implements the functionality of the analytics platform 105. Such a processing platform is illustratively part of a cloud-based or enterprise-based data center.

In operation, the analytics platform 105 receives input data from one or more of the data sources 102, identifies an instance of a KPI management data model associated with the received input data, and performs a particular KPI service on the received input data in accordance with the identified instance of the KPI management data model. Such KPI services are also referred to in the context of some embodiments herein as "generic" KPI services, as multiple distinct KPI services are configured in a standardized manner in accordance with a KPI management data model having a predetermined format.

The identified instance of the KPI management data model associated with the received input data illustratively comprises a particular instance of a given one of the one or more KPI management data models 112 of the generic KPI service module 110.

An example of such a KPI management data model is shown in FIG. 5, and different instances of that data model configured to perform respective different KPI services are shown in FIGS. 6 through 9.

The input data is initially received in the FIG. 1 embodiment by the input data processing module 120. For example, the input data processing module 120 can be configured to automatically receive streaming data from one or more of the data sources 102, and/or to retrieve batch data periodically from one or more of the data sources 102. The term "input data" as used herein is intended to be broadly construed so as to encompass data streamed from, retrieved from or otherwise obtained from one or more of the data sources 102. Such input data can therefore be obtained using various "push" or "pull" mechanisms implemented within the system 100, or combinations of such mechanisms. Different types of input data can be obtained from different ones of the data sources 102.

The generic KPI service module 110 is configured to perform the particular KPI service on the received input data in accordance with the identified instance of the KPI management data model. For example, performing the particular KPI service comprises utilizing the identified instance of the KPI management data model in model-based metric extraction module 114 to extract one or more metrics from the received input data, and utilizing the identified instance of the KPI management data model in model-based KPI computation module 116 to compute one or more KPIs based at least in part on the one or more extracted metrics. The identified instance of the KPI management data model is therefore utilized in both metric extraction and KPI computation from extracted metrics in this embodiment.

Performing the particular KPI service illustratively further comprises generating analytics output comprising the one or more computed KPIs for the received input data. The analytics output is illustratively provided at least in part by the computed KPI reporting module 122 to one or more of the reporting devices 106 over the network 104.

The analytics platform 105 in the present embodiment is further configured to perform automated decision making and other automated processing via the automated KPI-driven processing module 124. Such automated processing applies the analytics output generated by one or more model-based KPI services to provide improved performance within the system 100. For example, the automated KPI-driven processing module 124 can comprise machine learning algorithms or other types of artificial intelligence (AI) configured to autonomously direct the system 100 towards an optimal configuration.

The analytics platform 105 is illustratively configured to provide the analytics output comprising the one or more computed KPIs to a message broker, such as an Apache Kafka® message broker.

The analytics platform 105 is configured in the present embodiment to perform different KPI services in accordance with respective different instances of a given one of the one or more KPI management data models 112, with each such instance having a plurality of fields arranged in a predefined format common to the different instances.

For example, the identified instance of the KPI management data model illustratively comprises a plurality of fields including at least a metrics field specifying the one or more metrics to be extracted in performing the particular KPI service and a calculation field specifying the manner in which the one or more KPIs are to be computed based at least in part on the one or more extracted metrics. The calculation field in some embodiments comprises one or more mathematical and/or machine learning ("Math/ML") expressions or algorithms. Examples of mathematical expressions include basic arithmetic operations as well as complex mathematical expressions possibly including calculus. Machine learning examples include regression analysis algorithms, time series algorithms, topic clustering algorithms, etc. Any type of Math/ML computations can therefore be supported by the calculation field, and its configuration may be implemented to accommodate specification of various ranges of different types of Math/ML computations. However, such utilization of Math/ML is only an example, and other types of calculation field arrangements supporting other types of KPI computations can be used in other embodiments.

Examples of metrics that may be extracted in some embodiments include resource utilization metrics (e.g., central processing unit (CPU) usage, CPU capacity, memory usage, memory capacity, file system usage, storage input/output (I/O), etc.), network utilization metrics (e.g., network traffic in, network traffic out, network traffic volume, network traffic count, dropped packets, etc.) and application metrics (e.g., session errors, response times, error rates, etc.), as well as numerous others.

Additional examples of metrics that may be used in illustrative embodiments can be seen in the metrics fields of the respective KPI management data model instances of FIGS. 6 through 9. These model instances also include respective calculation fields that provide examples of KPI computations for respective KPI services.

In some embodiments, the extracted metrics comprise respective lower-level KPIs, and the KPI computations of the model-based KPI services generate higher-level KPIs from the metrics corresponding to the lower-level KPIs. The term "KPI" as used herein is therefore intended to be broadly construed, and in some cases may comprise a metric extracted from at least one data stream or other type of received input data.

The identified instance of the KPI management data model can include additional or alternative fields, including, for example, a name field providing a name for a given set of one or more KPIs to be computed as part of the KPI service, a type field specifying whether the received input data comprises real-time data or batch data, a window field specifying a particular type of computational window (e.g., specifying use of a sliding window or a tumbling window for computation of KPIs), a filters field specifying one or more filters to be applied to the received input data, an input field identifying the one or more sources of the received input data, and an output field identifying at least one destination for the analytics output comprising the one or more computed KPIs.

As mentioned previously, examples of the above-described fields can be seen in the KPI management data model of FIG. 5 and the corresponding example model instances of FIGS. 6 through 9. It is to be appreciated, however, that these particular models, model instances and field arrangements are only examples, and should not be construed as limiting in any way. Those skilled in the art will recognize that a wide variety of other types of KPI management data models and associated fields may be used. The term "KPI management data model" as used herein is therefore intended to be broadly construed.

The analytics platform 105 can provide an API through which at least portions of at least one instance of the KPI management data model are configurable by a system user. Such arrangements can facilitate sharing of a given instance of the KPI management data model between multiple distinct cloud infrastructure tenants.

In some embodiments, the analytics platform 105 comprises an analytics engine configured to perform the particular KPI service on the received input data in accordance with the identified instance of the KPI management data model. Such an analytics engine can comprise, for example, an otherwise conventional Apache Flink® stream processing framework suitably modified to support model-based KPI service functionality as disclosed herein. As another example, the analytics engine may comprise an otherwise conventional Apache Spark cluster computing framework configured to perform Spark streaming computations utilizing Spark resilient distributed datasets (RDDs), again modified to support model-based KPI service functionality as disclosed herein.

A wide variety of other implementations of the analytics platform 105 can be used. For example, in some embodiments, the analytics platform 105 comprises a time-series database configured to perform the particular KPI service on the received input data in accordance with the identified instance of the KPI management data model. An example of a time-series database that can be used in some embodiments is InfluxDB. Such a time-series database can be configured to support model-based KPI service functionality as disclosed herein.

It is to be appreciated that components of the analytics platform 105 can be implemented within respective separate physical systems in some embodiments. A processing platform such as the analytics platform 105 in the FIG. 1 embodiment can therefore be implemented as a combination of multiple distinct physical systems or as a single physical system. Accordingly, the particular arrangement of analytics platform 105 and its components as shown in FIG. 1 is presented by way of example only. In other embodiments, only subsets of these components, or additional or alternative sets of components, may be used, and such components may exhibit alternative functionality and configurations. In addition, as previously noted, at least a subset of the data sources 102 may be part of the same processing platform that is used to implement at least a portion of the analytics platform 105.

The operation of the information processing system 100 will now be described in further detail with reference to the flow diagram of the illustrative embodiment of FIG. 2. This figure illustrates a process that includes steps 200 through 210, and is suitable for use in system 100 but is more generally applicable to other types of information processing systems that implement model-based KPI service functionality.

Figure 2:
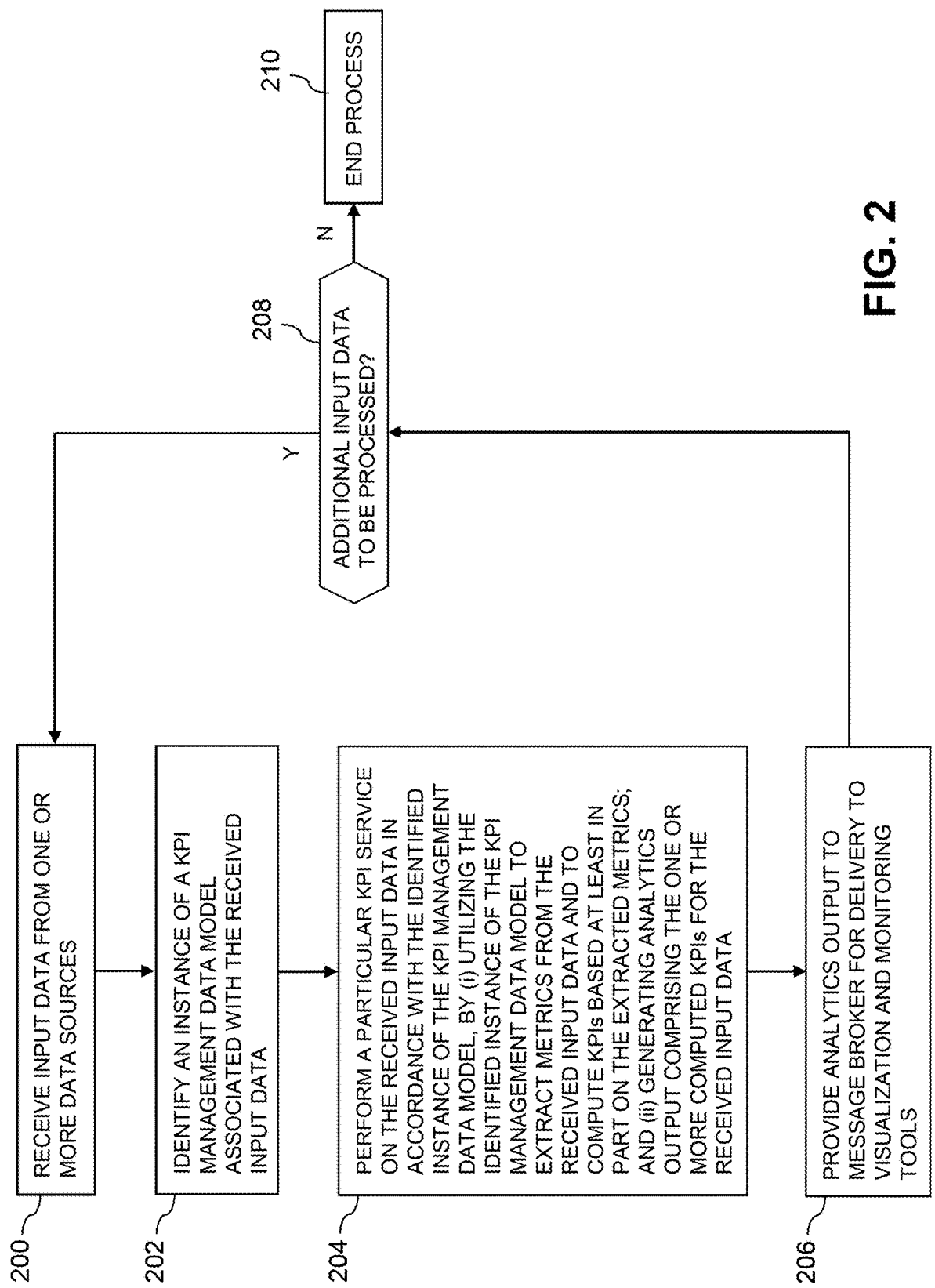
FIG. 2 is a flow diagram of an exemplary process for implementing model-based KPI service functionality in an illustrative embodiment.

The steps of the flow diagram of FIG. 2 in some implementations are illustratively performed at least in part under the control of the generic KPI service module 110 in the analytics platform 105 of system 100 with involvement of other components such as the input data processing module 120, the computed KPI reporting module 122 and the automated KPI-driven processing module 124.

In step 200, input data is received from one or more data sources. The received input data can comprise real-time data, batch data or other types and arrangements of data, obtained via any of a wide variety of mechanisms. For example, the received input data may comprise at least one of real-time streaming data received from one or more real-time data sources and batch data retrieved from one or more databases or data lakes.

In step 202, an instance of a KPI management data model associated with the received input data is identified. The instance of the KPI management data model illustratively comprises a particular configured instance of a model having a predefined format. Accordingly, different KPI services can be performed in accordance with respective different instances of the KPI management data model with each such instance having a plurality of fields arranged in a predefined format common to the different instances. An API is illustratively provided through which at least portions of at least one instance of the KPI management data model are configurable by a system user.

In step 204, a particular KPI service is performed on the received input data in accordance with the identified instance of the KPI management data model, by (i) utilizing the identified instance of the KPI management data model to extract metrics from the received input data and to compute KPIs based at least in part on the extracted metrics; and (ii) generating analytics output comprising the one or more computed KPIs for the received input data. The performance of the particular KPI service is model-driven in this embodiment in that the metrics that are extracted from the received input data for use in the KPI computation are specified by a metrics field of the identified instance of the KPI management data model, and in that the KPI computation using the extracted metrics is specified by a calculation field of the identified instance of the KPI management data model. Other types of model-based KPI services can be used in other embodiments. Also, although multiple metrics are extracted and used in the KPI computation in this embodiment, other embodiments can utilize only a single extracted metric, as indicated elsewhere herein.

In step 206, the analytics output is provided to a message broker for delivery to one or more visualization and monitoring tools.

In step 208, a determination is made as to whether or not there is additional data to be processed. If there is additional data to be processed, the process returns to step 200 to receive additional input data from one or more data sources. Otherwise, the process ends as indicated in step 210.

As mentioned previously, various automated KPI-driven processing operations may be performed utilizing analytics output of the type generated by model-based KPI services in the FIG. 2 process. For example, automated alerts can be generated and transmitted to reporting devices or other system components. Alerts may be in the form of reports that are periodically provided to IT operations specialists or other system users via their respective reporting devices or other processing devices.

In some embodiments, automated processing operations include remedial actions such as automatically altering an allocation of network, storage and compute resources within the information processing system in order to drive the system toward an optimal configuration based at least in part on the computed KPIs. This may more particularly involve, for example, adjusting a number of running containers or virtual machines for one or more applications, migrating containers or virtual machines for one or more application from one host device to another, and modifying an amount of compute, storage and network resources that are allocated to a given application. Numerous other types of automated processing operations can be performed in other embodiments.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for implementing model-based KPI service functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different KPI services for respective different sets of input data within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments of information processing systems with model-based KPI service functionality will now be described with reference to FIGS. 3 and 4.

Figure 3:
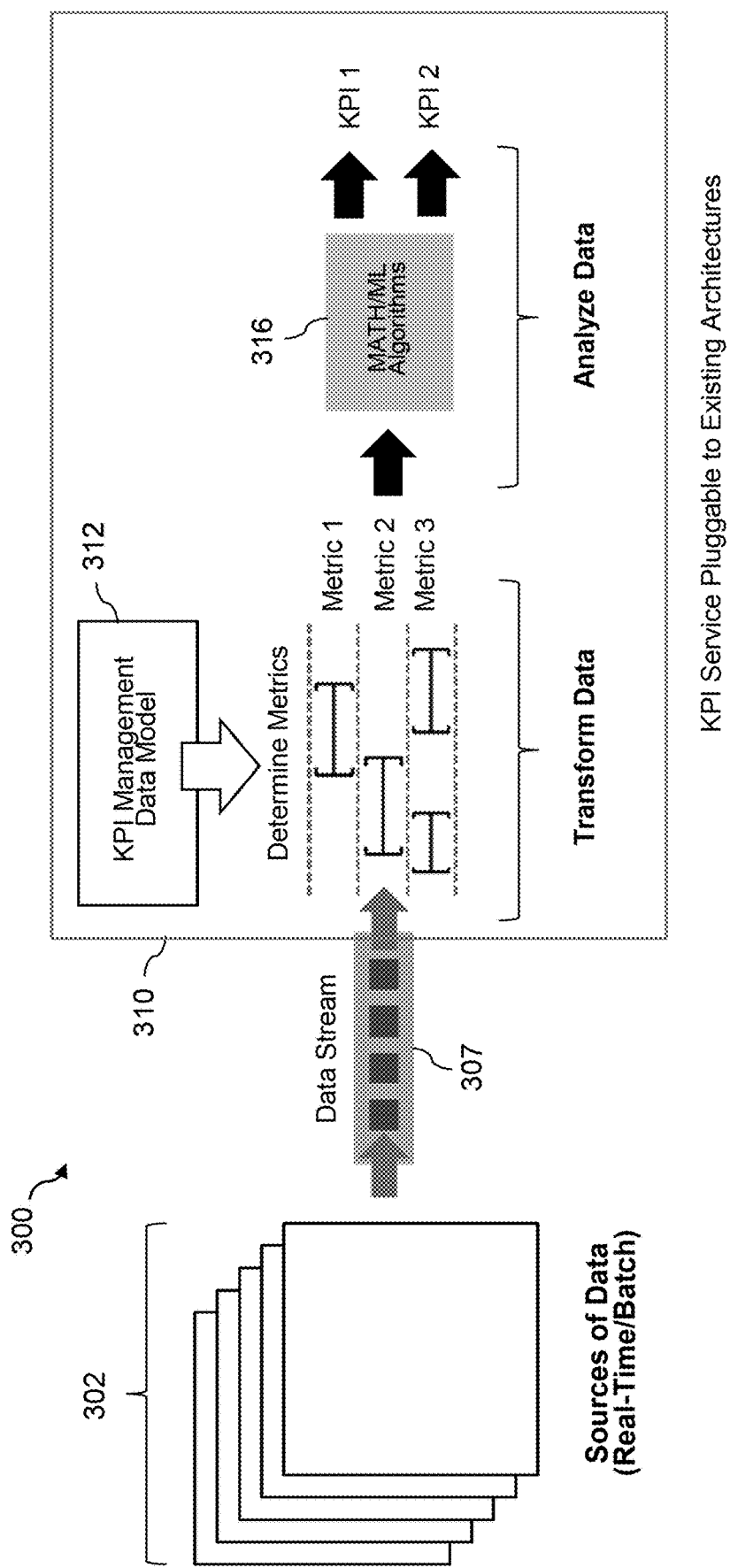
FIGS. 3 and 4 show additional examples of information processing systems implementing model-based KPI service functionality in other embodiments.

Referring initially to FIG. 3, an information processing system 300 comprises a plurality of data sources 302 and a generic KPI service module 310. The data sources 302 and generic KPI service module 310 are assumed to be implemented on one or more processing platforms of the type described elsewhere herein. The data sources 302 comprise respective sources of real-time and/or batch data and generate one or more data streams 307 that are processed by the generic KPI service module 310. The generic KPI service module 310 in this embodiment is implemented in the form of a "pluggable" software module suitable for providing model-based KPI service functionality in existing analytics architectures, such as an Apache Flink® stream processing framework, an Apache Spark cluster computing framework, and/or an InfluxDB time-series database platform.

The generic KPI service module 310 in this embodiment identifies a particular instance of a KPI management data model 312 associated with the one or more data streams 307 and utilizes a metrics field of the identified instance of the KPI management data model 312 to determine particular metrics to be extracted from the one or more data streams 307. These metrics in the present embodiment include metrics denoted as Metric 1, Metric 2 and Metric 3 in the figure. The generic KPI service module 310 transforms the received input data comprising the one or more data streams 307 in order to extract the specified metrics, and then utilizes those extracted metrics to analyze the data in accordance with Math/ML algorithms 316 that are specified by a calculation field of the identified instance of the KPI management data model 312. The Math/ML algorithms in this embodiment generate analytics output comprising multiple KPIs denoted as KPI 1 and KPI 2 in the figure.

This generation of analytics output comprising one or more KPIs in accordance with information specified in an instance of KPI management data model 312 is an example of what is more generally referred to herein as a "model-based KPI service." Other types of model-based KPI services can be provided in other embodiments.

Figure 4:
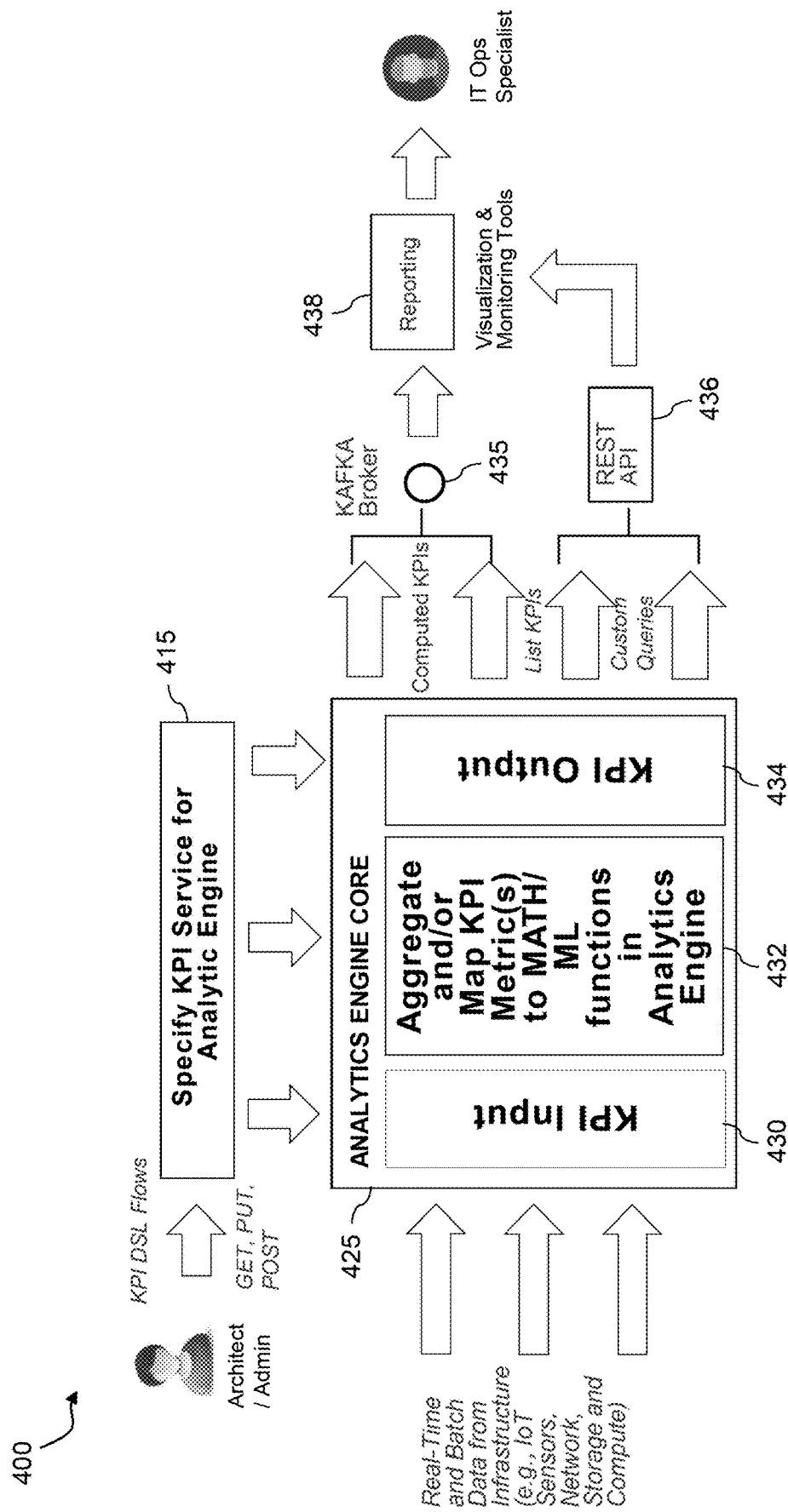

Referring now to FIG. 4, an information processing system 400 comprises an API 415 through which a KPI service architect, system administrator or other system user can specify particular model-based KPI services to be performed by an analytics engine core 425. The system user provides KPI domain specific language (DSL) flows illustratively comprising GET, PUT and POST operations to the API 415. Examples of such API operations in the context of a representational state transfer (REST) API will be described below in conjunction with the illustrative embodiment of FIG. 10.

The analytics engine core 425 illustratively comprises a core portion of an Apache Flink® stream processing framework, an Apache Spark cluster computing framework, and/or an InfluxDB time-series database platform, suitably modified to support model-based KPI service functionality as disclosed herein.

The analytics engine core 425 more particularly comprises a KPI input portion 430, a metric extraction and KPI computation portion 432, and a KPI output portion 434. These portions may be viewed as collectively comprising a generic KPI service module of the type described elsewhere herein. The metric extraction and KPI computation portion 432 in this embodiment is more particularly configured to aggregate and/or map KPI metric(s) to one or more Math/ML functions in the analytics engine comprising the analytics engine core 425.

In operation, real-time and batch data from IT infrastructure data sources such as IoT sensors and network, storage and/or compute resources of the system 400 is obtained in the analytics engine core 425. The KPI input portion 430 identifies an instance of a KPI management data model associated with the received input data. A particular KPI service is then performed on the received input data in accordance with the identified instance of the KPI management data model, illustratively by the metric extraction and KPI computation portion 432 and the KPI output portion 434.

For example, performing the particular KPI service in some implementations of the FIG. 4 embodiment illustratively comprises utilizing the identified instance of the KPI management data model to extract one or more metrics from the received input data and to compute one or more KPIs based at least in part on the one or more extracted metrics, in the metric extraction and KPI computation portion 432. Performing the particular KPI service further comprises generating analytics output comprising the one or more computed KPIs for the received input data, in the KPI output portion 434.

In this embodiment, the analytics engine core 425 provides the analytics output comprising the computed KPIs to a message broker 435, which is illustratively an Apache Kafka® message broker, although other types of message brokers may be used.

The system 400 provides a REST API 436 of the type described previously that can also support additional functionality such as list KPIs and custom queries as indicated in the figure. This is illustratively the same API through which at least portions of at least one instance of the KPI management data model are configurable by a system user.

Both the message broker 435 and the REST API 436 in the FIG. 4 embodiment communicate with at least one reporting device 438 that is accessible to an IT operations specialist or other type of system user. The reporting device 438 illustratively provides system user access to one or more visualization and monitoring tools, such as at least one Grafana dashboard for analytics monitoring. The message broker 435 is assumed to be configured to deliver analytics output including computed KPIs to one or more visualization and monitoring tools of the reporting device 438.

FIG. 5 shows an example of a KPI management data model in an illustrative embodiment. In this embodiment, the KPI management data model comprises multiple fields, including a name field, a KPI type ("kpiType") field, a calculation field, a metrics field, a window field, a filters field, an input field and an output field.

The name field specifies the name of the KPI or set of KPIs to be generated as part of a particular KPI service.

The kpiType field specifies the type of data which is processed in conjunction with the KPI service, illustratively real-time or batch data.

The calculation field specifies the manner in which the one or more KPIs are to be computed based at least in part on one or more extracted metrics. For example, the calculation field can specify a Math/ML expression for the KPI calculation, or one or more Math/ML algorithms.

The metrics field specifies the one or more metrics to be extracted in performing the particular KPI service.

The window field specifies a particular type of computational window, illustratively a sliding window or a tumbling window. Tumbling windows illustratively comprise a series of fixed-size, non-overlapping and contiguous time windows. Unlike sliding windows, tumbling windows maintain state from window to window.

The filters field specifies one or more filters to be applied to the received input data.

The input field specifies at least one input data source for the KPI service, such as a Kafka® broker, a file, a database, etc.

The output field specifies at least one destination for the analytics output comprising the one or more computed KPIs generated as part of the particular KPI service, such as a Kafka® broker, a file, a database, etc.

Again, the particular fields and their respective configurations in the example KPI management data model of FIG. 5 are presented for purposes of illustration only, and should not be viewed as limiting in any way.

Examples of particular instances of the FIG. 5 model with their respective fields populated to implement particular KPI services are shown in FIGS. 6 through 9.

FIG. 6 shows an example of an instance of a KPI management data model for a model-based KPI service to calculate storage input/output operations per second (IOPS) for a ScaleIO™ storage system.

FIG. 7 shows an example of an instance of a KPI management data model for a model-based KPI service to calculate storage utilization.

FIG. 8 shows an example of an instance of a KPI management data model for a model-based KPI service to calculate a data center health score. The particular KPI management data model used in this example has an additional "ranges" field relative to the model described in conjunction with FIG. 5.

FIG. 9 shows an example of an instance of a KPI management data model for a model-based KPI service to calculate a historical KPI for Euclidean distance based on network utilization metrics.

FIG. 10 shows an example of a KPI Management REST API of the type previously described in conjunction with the FIG. 4 embodiment. This REST API more particularly includes operations for creating, updating, deleting, submitting, enabling and disabling KPI services of the type illustrated in the examples of FIGS. 6 through 9. Other types of REST APIs having different operation types and configurations can be used.

Illustrative embodiments of information processing systems with model-based KPI service functionality as disclosed herein can provide a number of significant advantages relative to conventional arrangements.

For example, some embodiments provide techniques for implementation of model-based KPI services in analytics platforms and other types of processing platforms. Such arrangements in some embodiments advantageously facilitate the uniform specification and computation of KPI services for performing analytics using a variety of different types of data. These embodiments avoid the need for user mastery of potentially large numbers of distinct APIs that may be associated with various types of streaming analytics systems, time-series databases and monitoring systems utilized in performing data analytics. As a result, the cost and complexity of performing data analytics is considerably reduced. Moreover, automated decision making and other automated processing performed in an information processing system utilizing analytics output is considerably enhanced through the use of model-based KPI services, leading to improved system performance.

Some embodiments provide a standard and generic mechanism to efficiently control the computation of desired KPIs in a wide variety of different analytics frameworks, such as an Apache Flink® stream processing framework, an Apache Spark cluster computing framework, and/or an InfluxDB time-series database platform.

These and other embodiments utilize common KPI management data models to provide accurate and efficient analysis of real-time and batch data obtained from numerous different types of data sources.

The model-based KPI service functionality disclosed herein allows efficient management of KPIs irrespective of whether the data to be analyzed is centralized or distributed, while also reducing code complexity and promoting sharing and reusability of KPI services. Such embodiments allow KPI services to be deployed in an efficient manner that enhances the quality of decision making.

Illustrative embodiments allow higher-level KPIs to be created from metrics corresponding to respective lower-level KPIs, using a common KPI management data model for multiple distinct KPI service instances.

Some embodiments are configured to manage KPIs declaratively using a common DSL language, supporting KPI calculations based on simple or complex Math/ML expressions or algorithms.

Illustrative embodiments provide REST APIs to define, create, submit, run and otherwise control KPI management jobs, and facilitate the sharing of KPI services across various tenants of a common processing platform.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement model-based KPI service functionality will now be described in greater detail with reference to FIGS. 11 and 12. Although described in the context of system 100, these platforms may also be used to implement at least portions of other information processing systems in other embodiments.

Figure 11:
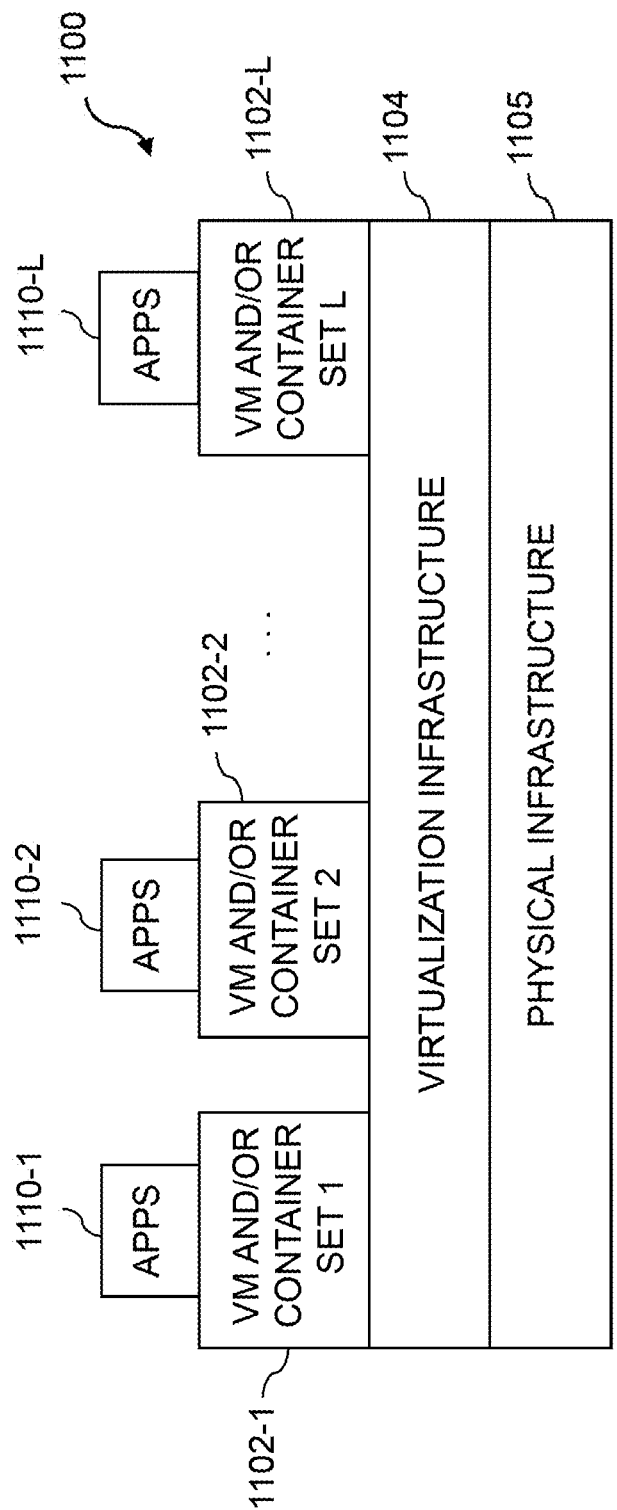
FIGS. 11 and 12 show examples of processing platforms that may be utilized to implement at least a portion of an information processing system in illustrative embodiments.
Figure 12:
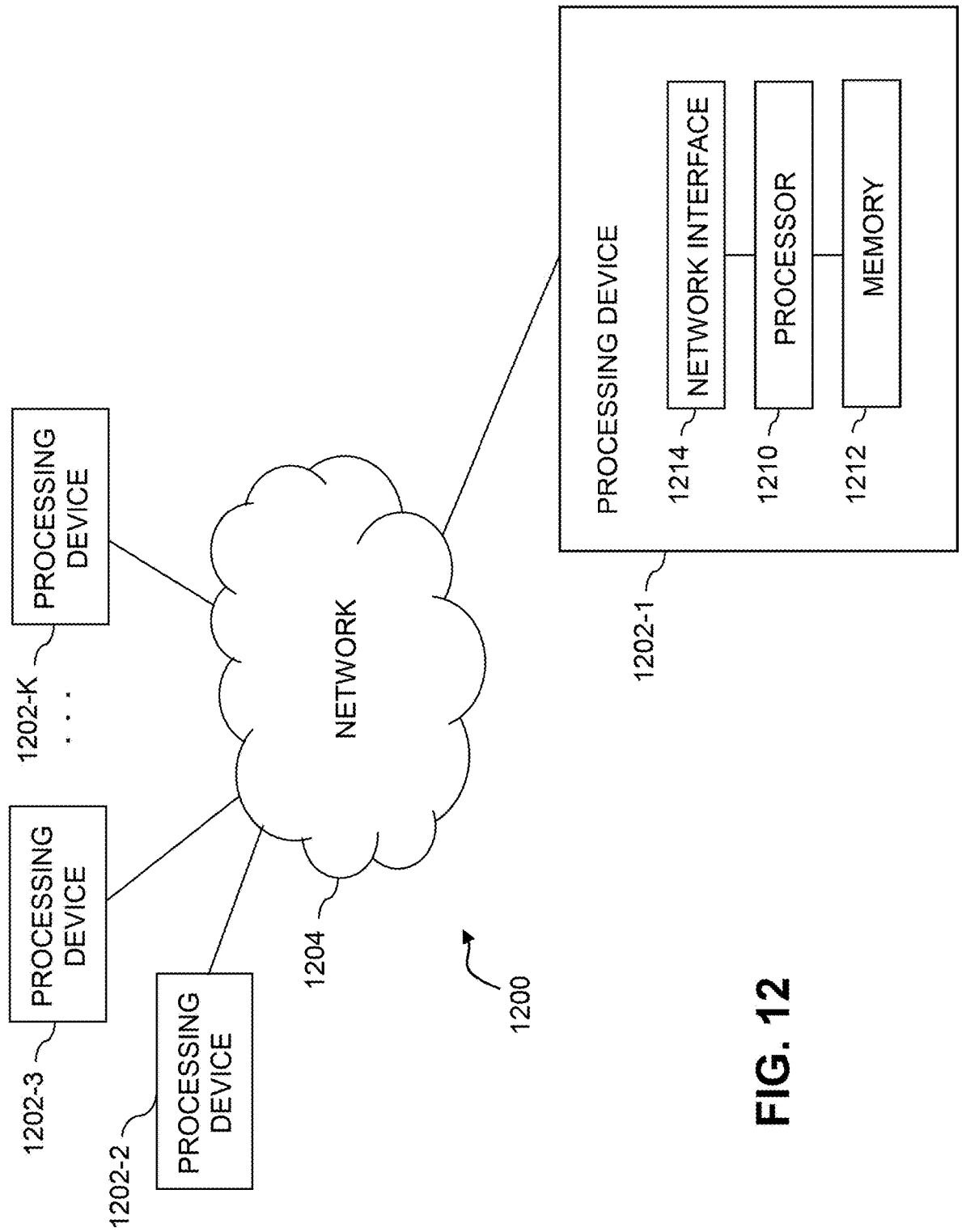

FIG. 11 shows an example processing platform comprising cloud infrastructure 1100. The cloud infrastructure 1100 comprises a combination of physical and virtual processing resources that may be utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. Such implementations can provide model-based KPI service functionality of the type described above utilizing one or more of the VMs.

An example of a hypervisor platform that may be used to implement a hypervisor within the virtualization infrastructure 1104 is the VMware® vSphere® which may have an associated virtual infrastructure management system such as the VMware® vCenter™. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system. Such implementations can provide model-based KPI service functionality of the type described above utilizing one or more of the containers. For example, a container host device supporting multiple containers of one or more container sets can implement one or more instances of the FIG. 2 process for providing model-based KPI services.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the storage functionality of one or more components of a host device or storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, processing platforms, model-based KPI service modules, analytics engines, KPI management data models, computed KPIs and other components and features. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a processing platform comprising a plurality of processing devices each comprising a processor coupled to a memory;
the processing platform being configured to communicate over a network with one or more data sources, the one or more data sources comprising a plurality of Internet of Things (IoT) sensors;
the processing platform being further configured:
to receive input data from the one or more data sources;
to identify first and second distinct instances of a key performance indicator (KPI) management data model associated with respective first and second portions of the received input data; and
to perform particular first and second distinct KPI services on the respective first and second portions of the received input data in accordance with the respective first and second identified instances of the KPI management data model;
wherein performing the particular first and second KPI services comprises:
utilizing the first identified instance of the KPI management data model to extract one or more first metrics from the first portion of the received input data and to compute one or more first KPIs based at least in part on the one or more extracted first metrics;
utilizing the second identified instance of the KPI management data model to extract one or more second metrics from the second portion of the received input data and to compute one or more second KPIs based at least in part on the one or more extracted second metrics;
generating analytics output comprising the one or more computed first KPIs and the one or more computed second KPIs for the received input data; and
automatically altering an allocation of one or more of network, storage and compute resources associated with the processing platform to obtain a particular configuration based at least in part on the analytics output;
wherein automatically altering an allocation of one or more of network, storage and compute resources associated with the processing platform to obtain a particular configuration based at least in part on the analytics output comprises one or more of adjusting a number of running containers or virtual machines for one or more applications, migrating containers or virtual machines for one or more applications from one host device to another, and modifying an amount of compute, storage and network resources that are allocated to a given application; and wherein the one or more extracted first metrics and the one or more extracted second metrics each comprise one or more of a resource utilization metric and an application metric.

2. The apparatus of claim 1 wherein the processing platform is configured to perform the particular first and second KPI services in accordance with the respective first and second instances of the KPI management data model with each such first and second instances having a plurality of fields arranged in a predefined format common to the respective first and second instances.

3. The apparatus of claim 1 wherein at least one of the first and second identified instances of the KPI management data model comprises a plurality of fields including at least a type field specifying whether the corresponding first or second portion of the received input data comprises real-time data or batch data.

4. The apparatus of claim 1 wherein at least one of the first and second identified instances of the KPI management data model comprises a plurality of fields including at least a window field specifying a particular type of computational window.

5. The apparatus of claim 4 wherein the window field identifies utilization of a particular one of a sliding window and a tumbling window for computation of the one or more KPIs.

6. The apparatus of claim 1 wherein at least one of the first and second identified instances of the KPI management data model comprises a plurality of fields including at least a filters field specifying one or more filters to be applied to the corresponding first or second portion of the received input data.

7. The apparatus of claim 1 wherein at least one of the first and second identified instances of the KPI management data model comprises a plurality of fields including at least an input field identifying the one or more sources of the corresponding first or second portion of the received input data and an output field identifying at least one destination for the analytics output comprising the corresponding one or more computed first or second KPIs.

8. The apparatus of claim 1 wherein the processing platform comprises an analytics engine configured to perform the particular first and second KPI services on the respective first and second portions of the received input data in accordance with the respective first and second identified instances of the KPI management data model.

9. The apparatus of claim 1 wherein the processing platform comprises a time-series database configured to perform the particular first and second KPI services on the respective first and second portions of the received input data in accordance with the respective first and second identified instances of the KPI management data model.

10. The apparatus of claim 1 wherein the processing platform is configured to provide the analytics output comprising the one or more computed first and second KPIs to a message broker.

11. The apparatus of claim 1 wherein the processing platform is configured to provide an application programming interface through which at least portions of at least one instance of the KPI management data model are configurable by a system user.

12. The apparatus of claim 1 wherein the processing platform is configured to permit at least one instance of the KPI management data model to be shared by multiple distinct cloud infrastructure tenants.

13. The apparatus of claim 1 wherein the received input data comprises at least one of real-time streaming data received from one or more real-time data sources and batch data retrieved from one or more databases or data lakes.

14. A method comprising:
receiving input data from one or more data sources, the one or more data sources comprising a plurality of Internet of Things (IoT) sensors;
identifying first and second distinct instances of a key performance indicator (KPI) management data model associated with respective first and second portions of the received input data; and
performing particular first and second distinct KPI services on the respective first and second portions of the received input data in accordance with the respective first and second identified instances of the KPI management data model;
wherein performing the particular first and second KPI services comprises:
utilizing the first identified instance of the KPI management data model to extract one or more first metrics from the first portion of the received input data and to compute one or more first KPIs based at least in part on the one or more extracted first metrics;
utilizing the second identified instance of the KPI management data model to extract one or more second metrics from the second portion of the received input data and to compute one or more second KPIs based at least in part on the one or more extracted second metrics;
generating analytics output comprising the one or more computed first KPIs and the one or more computed second KPIs for the received input data; and
automatically altering an allocation of one or more of network, storage and compute resources associated with the processing platform to obtain a particular configuration based at least in part on the analytics output;
wherein automatically altering an allocation of one or more of network, storage and compute resources associated with the processing platform to obtain a particular configuration based at least in part on the analytics output comprises one or more of adjusting a number of running containers or virtual machines for one or more applications, migrating containers or virtual machines for one or more applications from one host device to another, and modifying an amount of compute, storage and network resources that are allocated to a given application;
wherein the one or more extracted first metrics and the one or more extracted second metrics each comprise one or more of a resource utilization metric and an application metric; and
wherein the method is implemented by a processing platform comprising a plurality of processing devices each comprising a processor coupled to a memory.

15. The method of claim 14 further comprising performing the particular first and second KPI services in accordance with the respective first and second instances of the KPI management data model with each such first and second instances having a plurality of fields arranged in a predefined format common to the respective first and second instances.

16. A computer program product comprising a non-transitory processor-readable storage medium having stored therein program code of one or more software programs, wherein the program code when executed by a processing platform comprising a plurality of processing devices, each such processing device comprising a processor coupled to a memory, causes the processing platform:

to receive input data from one or more data sources, the one or more data sources comprising a plurality of Internet of Things (IoT) sensors;

to identify first and second distinct instances of a key performance indicator (KPI) management data model associated with respective first and second portions of the received input data; and to perform particular first and second distinct KPI services on the respective first and second portions of the received input data in accordance with the respective first and second identified instances of the KPI management data model;

wherein performing the particular first and second KPI services comprises:

utilizing the first identified instance of the KPI management data model to extract one or more first metrics from the first portion of the received input data and to compute one or more first KPIs based at least in part on the one or more extracted first metrics;

utilizing the second identified instance of the KPI management data model to extract one or more second metrics from the second portion of the received input data and to compute one or more second KPIs based at least in part on the one or more extracted second metrics;

generating analytics output comprising the one or more computed first KPIs and the one or more computed second KPIs for the received input data; and automatically altering an allocation of one or more of network, storage and compute resources associated with the processing platform to obtain a particular configuration based at least in part on the analytics output;

wherein automatically altering an allocation of one or more of network, storage and compute resources associated with the processing platform to obtain a particular configuration based at least in part on the analytics output comprises one or more of adjusting a number of running containers or virtual machines for one or more applications, migrating containers or virtual machines for one or more applications from one host device to another, and modifying an amount of compute, storage and network resources that are allocated to a given application; and wherein the one or more extracted first metrics and the one or more extracted second metrics each comprise one or more of a resource utilization metric and an application metric.

17. The computer program product of claim 16 wherein the processing platform is configured to perform the particular first and second KPI services in accordance with the respective first and second instances of the KPI management data model with each such first and second instances having a plurality of fields arranged in a predefined format common to the respective first and second instances.

18. The computer program product of claim 16 wherein the processing platform comprises an analytics engine configured to perform the particular first and second KPI services on the respective first and second portions of the received input data in accordance with the respective first and second identified instances of the KPI management data model.

19. The computer program product of claim 16 wherein the processing platform comprises a time-series database configured to perform the particular first and second KPI services on the respective first and second portions of the received input data in accordance with the respective first and second identified instances of the KPI management data model.

20. The computer program product of claim 16 wherein at least one of the first and second identified instances of the KPI management data model comprises a plurality of fields including at least a metrics field specifying the one or more first or second metrics to be extracted in performing the corresponding particular first or second KPI services and a calculation field specifying the manner in which the one or more first or second KPIs are to be computed based at least in part on the one or more extracted first or second metrics.

* * * * *